US009696982B1

(12) United States Patent
Michalik et al.

(10) Patent No.: US 9,696,982 B1
(45) Date of Patent: Jul. 4, 2017

(54) SAFE HOST DEPLOYMENT FOR A HETEROGENEOUS HOST FLEET

(71) Applicant: Amazon Technologies, Inc., Seattle, WA (US)

(72) Inventors: Andrew Joseph Michalik, Seattle, WA (US); Weizhong Hua, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 208 days.

(21) Appl. No.: 14/072,262

(22) Filed: Nov. 5, 2013

(51) Int. Cl.
G06F 9/44 (2006.01)
G06F 9/445 (2006.01)

(52) U.S. Cl.
CPC .................... *G06F 8/65* (2013.01)

(58) Field of Classification Search
CPC .......................................... G06F 9/44
USPC ......................... 717/168–172, 177
See application file for complete search history.

(56) References Cited

U.S. PATENT DOCUMENTS

| 7,856,626 | B2* | 12/2010 | Abernethy, Jr. .......... G06F 8/72 717/116 |
| 7,865,889 | B1* | 1/2011 | Bird .......................... G06F 8/60 717/168 |
| 8,918,555 | B1* | 12/2014 | Drobychev ............. G06F 13/00 710/15 |
| 9,058,233 | B1* | 6/2015 | Zeng |
| 2003/0009558 | A1* | 1/2003 | Ben-Yehezkel ......... G06F 9/505 709/225 |
| 2003/0110172 | A1* | 6/2003 | Selman et al. ................... 707/10 |
| 2003/0149769 | A1* | 8/2003 | Axberg et al. ................. 709/225 |
| 2003/0217308 | A1* | 11/2003 | Volkov ............................ 714/38 |
| 2003/0236942 | A1* | 12/2003 | Kishi et al. .................... 711/113 |
| 2004/0128363 | A1* | 7/2004 | Yamagami .......... G06F 11/2069 709/217 |
| 2006/0080656 | A1* | 4/2006 | Cain et al. ..................... 717/174 |
| 2006/0173992 | A1* | 8/2006 | Weber et al. ................. 709/224 |
| 2006/0265708 | A1* | 11/2006 | Blanding .................. G06F 8/65 717/174 |
| 2007/0118654 | A1* | 5/2007 | Jamkhedkar ............... G06F 8/60 709/226 |
| 2007/0240143 | A1* | 10/2007 | Guminy .................... G06F 8/70 717/168 |
| 2010/0306364 | A1* | 12/2010 | Terry ..................... H04L 12/66 709/224 |

(Continued)

*Primary Examiner* — Jae Jeon
(74) *Attorney, Agent, or Firm* — Lee & Hayes, PLLC

(57) ABSTRACT

Technologies are described herein for deploying an update to hosts in a heterogeneous host fleet. One or more relevant host attributes for hosts in the host fleet are identified. Hosts in the fleet of hosts are classified into groups based on the identified relevant host attributes. A pilot host set is built by selecting one or more hosts from one or more of the groups according to a pilot host selection criteria. The update is deployed to the hosts included in the pilot host set as a test deployment. If the test deployment is successful, the update is deployed to the remaining hosts in the fleet of hosts; otherwise, the deployment is modified to continue the deployment to a subset of the host or to cancel the deployment and to restore the hosts in the pilot host set to their previous states. An analysis may be conducted based on the deployment data to provide recommendations for future deployments.

14 Claims, 7 Drawing Sheets

(56) References Cited

U.S. PATENT DOCUMENTS

| | | | | |
|---|---|---|---|---|
| 2011/0271275 | A1* | 11/2011 | Ochi | G06F 8/63 |
| | | | | 717/177 |
| 2013/0110949 | A1* | 5/2013 | Maurel | G06Q 30/02 |
| | | | | 709/206 |
| 2013/0297964 | A1* | 11/2013 | Hegdal | G06F 11/0712 |
| | | | | 714/2 |
| 2013/0339358 | A1* | 12/2013 | Huibers | G06F 17/30312 |
| | | | | 707/737 |
| 2014/0160057 | A1* | 6/2014 | Lee | G06F 3/0418 |
| | | | | 345/174 |
| 2014/0173739 | A1* | 6/2014 | Ahuja et al. | 726/25 |
| 2014/0320464 | A1* | 10/2014 | Ryu | G09G 3/3688 |
| | | | | 345/204 |
| 2014/0343989 | A1* | 11/2014 | Martini | G06Q 10/063118 |
| | | | | 705/7.17 |

* cited by examiner

SAFE HOST DEPLOYMENT FOR A HETEROGENEOUS HOST FLEET

BACKGROUND

Deploying software updates to computers or hosts in a fleet of computing systems is a common practice in order to maintain and upgrade software applications executing on the hosts. For instance, it may be necessary to periodically apply software updates to software executing on various hosts in order to implement security patches, bug fixes, or feature improvements. An update might install new software components, patch existing software components, remove software components from the host, and/or perform other tasks.

Some environments might include host fleets containing large numbers of heterogeneous hosts, which makes the deployment of updates to these hosts complicated. For example, some network-based services that allow customers to purchase and utilize instances of computing resources like virtual machine instances might utilize a host fleet containing hundreds of thousands or even millions of hosts. Each of these server computers may have its own configuration of hardware and installed software. Consequently, there may be tens or even hundreds of thousands of unique combinations of hardware and software components in such a host fleet.

Due to the commonly high heterogeneity of these host fleets, the impact of deploying an update to hosts in such a host fleet might be highly unpredictable. Problems caused by an update might not be discovered until the deployment of the update to the host fleet causes a failure. As a result, it may be necessary to expend a significant amount of time and resources in order to roll back the deployment of the update from the hosts.

The disclosure made herein is presented with respect to these and other considerations.

DETAILED DESCRIPTION

Figure 1:
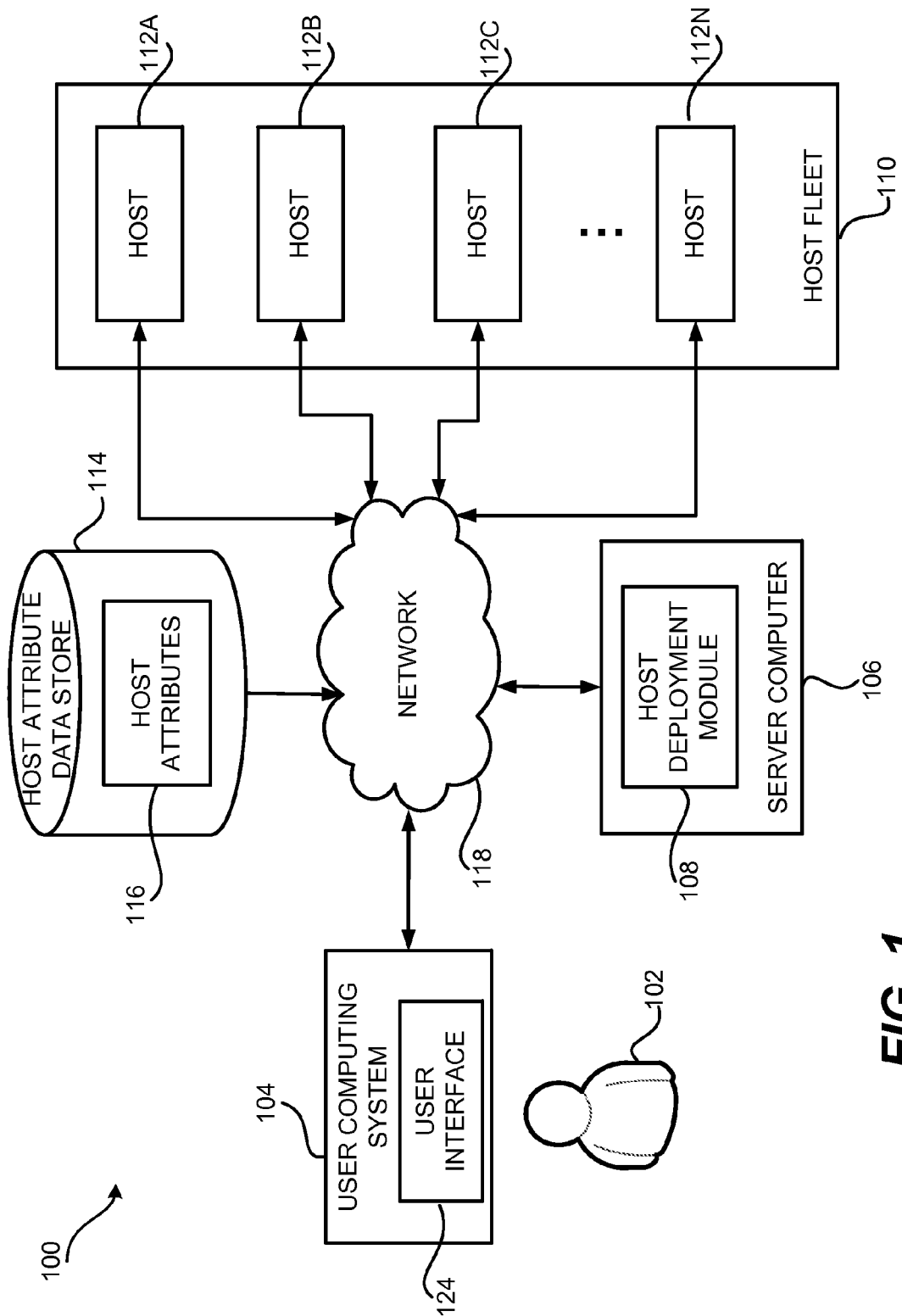
FIG. 1 is a system diagram showing aspects of an illustrative operating environment for the embodiments disclosed herein for deploying updates to hosts in a host fleet.

The following detailed description is directed to technologies for deploying updates to hosts in a heterogeneous host fleet. As used herein, a "heterogeneous host fleet" refers to a collection of hosts within which hosts may have different software and/or hardware configurations. Utilizing the concepts and technologies described herein, updates to hosts in a heterogeneous host fleet can be deployed in a safe manner by conducting a test deployment before deploying the updates to all the hosts in the host fleet. Potential problems can be discovered during the test deployment and thereby mass deployment failure can be avoided.

According to one aspect presented herein, a computer-implemented mechanism is disclosed for deploying updates to hosts in a heterogeneous host fleet. In particular, one or more relevant host attributes may be identified for hosts in the host fleet. A hash value may be calculated for the identified relevant host attributes for the hosts. Based on the hash values, the hosts in the host fleet may be divided into one or more groups. For example, hosts inside each group may have a same hash value for their identified relevant host attributes. One or more hosts in a group may be specified as representative hosts for that group. A pilot host set may then be built by selecting one or more representative hosts from one or more of the groups.

A software update to the hosts in the host fleet may be first deployed to the hosts contained in the pilot host set as a test deployment of the update. If the test deployment is successful, the remaining hosts in the host fleet may be updated with the update. Otherwise, the deployment may be modified such as to continue the deployment to a subset of hosts in the host fleet or to cancel the deployment and restore the hosts in the pilot host set to their previous states. Additional details regarding the various components and processes described above for deploying updates to hosts in a heterogeneous host fleet will be presented below with regard to FIGS. 1-7.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may be practiced in distributed execution environments, where tasks are performed by remote processing devices that are linked through a communications network. In a distributed execution environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 and the following description are intended to provide a brief, general description of a suitable computing environment in which the embodiments described herein may be implemented. In particular, FIG. 1 is a system diagram that shows aspects of an illustrative operating environment 100 for the embodiments disclosed herein for deploying updates to hosts in a host fleet.

The operating environment 100 may include a host fleet 110. The host fleet 110 illustrated in FIG. 1 contains hosts 112A-112N, which may be referred to individually as a host 112 or collectively as the hosts 112. The hosts 112 may be web servers, application servers, network appliances, dedicated computer hardware devices, personal computers ("PC"), or any combination of these and/or other computing devices known in the art. The hosts 112 may also be configured to host virtual machine instances, which in turn may be configured to execute applications such as World Wide Web ("Web") servers, application servers, media servers, database servers, and the like. As known in the art, a virtual machine instance is an instance of a software implementation of a machine (i.e. a computer) that executes programs like a physical machine. Virtual machine instances may be managed by an instance managing program, such as a hypervisor, configured to enable the execution of multiple instances on a single server. The hosts 112 may be accessible through a network 118, which may be a local-area network ("LAN"), a wide-area network ("WAN"), the Internet, or any other networking topology known in the art that enables communications with the hosts 112.

The operating environment 100 may also include a host attribute data store 114 storing host attributes 116 associated with each host 112. The host attributes 116 for a host 112 might describe various characteristics of the host 112. For example, the host attributes 116 may include, but are not limited to, software and hardware attributes of the host 112, such as instance manager, the operating system ("OS") of the host 112, OS distribution, installed software packages, version numbers, software configuration, software manufacturer, software vendor, network addressing, architecture type, hardware platform type, central processing unit ("CPU") type, installed memory, disk capacity, hardware manufacturer, hardware vendor, firmware type and settings, and other data relating to the software/hardware configuration and/or other types of attributes of the host 112.

In order to maintain and upgrade various software applications running on the hosts 112, software updates may need to be deployed to the hosts 112. As discussed above, the software updates might install new software components into the hosts 112, may patch existing software components in the hosts 112, may remove software components from the hosts 112, and/or perform other tasks for updating the software components of the hosts 112. As shown in FIG. 1, a host deployment module 108 executing on a server computer 106 may be employed to facilitate the deployment of updates to the hosts 112.

According to embodiments, the host deployment module 108 may select a subset of hosts 112 from the host fleet 110 based on the host attributes 116 stored in the host attribute data store 114. The updates may be deployed to the selected subset of hosts 112 before deployed to the entire host fleet 110. In some implementations, the selection of the subset of hosts 112 may be based on a subset of the host attributes 116. The selection of the subset of hosts 112 may also be based on deployments of previous updates to the hosts 112. If the deployment of the updates to the subset of hosts 112 is successful, the host deployment module 108 may further deploy the updates to the entire host fleet 110. If the deployment of the updates to the subset of hosts 112 is unsuccessful, the host deployment module 108 may modify the deployment, such as canceling the deployment of the updates and recovering the subset of hosts 112 back to their states prior to the deployment.

It should be appreciated that while FIG. 1 illustrates the host deployment module 108 executing on the server computer 106, the host deployment module 108 may be a software component executing on any hardware device within a computing system hosting the host fleet 110. In another embodiment, the host deployment module 108 might execute on a user computing system 104 operated by a user 102. The host deployment module 108 might also be implemented in special-purpose hardware or a combination of software and hardware. Other implementations might also be utilized. Additional details regarding the operation of the host deployment module 108 and related components are provided below with regard to FIGS. 2-6.

In another embodiment, the user 102 may be able to configure aspects of the operation of the host deployment module 108 through the user computing system 104. The user 102 might be an administrator or a developer of the service provider environment hosting the host fleet 110. The user computing system 104 might be a computer utilized by the user 102, which might be a server computer, a desktop or laptop personal computer, a tablet computer, a wireless telephone, a personal digital assistant ("PDA"), an e-reader, a game console, a set-top box, or any other computing device capable of connecting to the network 118 and communicating with the host deployment module 108.

As will be described in greater detail below, the host deployment module 108 might provide a user interface 124 through which aspects of its operation may be configured. The user interface 124 might be a Web interface rendered by a Web browser application program executing on the user computing system 104. Alternatively, the user interface 124 might be a user interface of a stand-alone application program executing on the user computing system 104 accessing an application programming interface ("API") exposed by the host deployment module 108 for performing the configuration operations. Other mechanisms for providing the user interface 124 and/or for configuring the operation of the host deployment module 108 might also be utilized.

The user interface 124 may allow the user 102 to specify host attributes 116 to be utilized by the host deployment module 108 when selecting a subset of hosts 112 for deployment. The user interface 124 might also provide a visualization of the host attributes 116 to facilitate the selection of the host attributes 116. According to further embodiments, the user interface 124 may allow the user 102 to specify various criteria to be used by the host deployment module 108 for deploying updates to the hosts 112 in the host fleet 110. Additional aspects regarding the user interface 124 will be provided below with regard to FIGS. 2 and 3.

Figure 2:
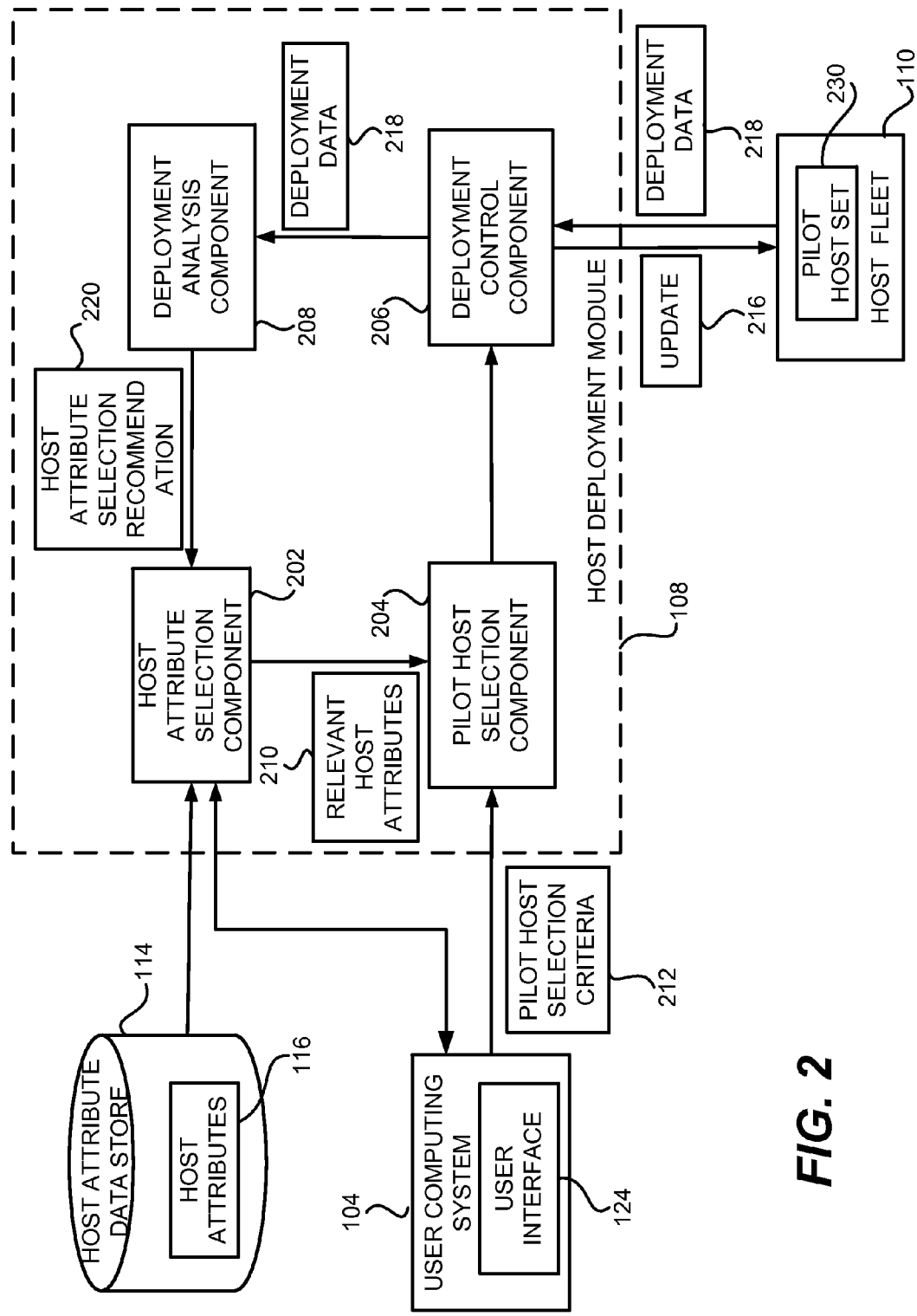
FIG. 2 is a software architecture diagram illustrating aspects of a host deployment module configured to support safe host deployment for a host fleet, according to embodiments presented herein.

FIG. 2 is a software architecture diagram illustrating aspects of a host deployment module 108 configured to support safe host deployment for a host fleet 110, according to embodiments presented herein. The host deployment module 108 might include a host attribute selection component 202, a pilot host selection component 204, a deployment control component 206, a deployment analysis component 208 and/or other components that might be utilized in the deployment process. These and other components of the host deployment module 108 may interact with one another as well as with other entities such as the host attribute data store 114 and the user computing system 104 to ensure a safe host deployment for the host fleet 110.

According to embodiments, the host deployment module 108 may deploy an update 216 in two stages. One stage may be a test deployment stage whereby a subset of hosts 112 in the host fleet 110, known as a "pilot host set" 230, consisting of pilot hosts may be selected and the update 216 may be deployed to the pilot hosts contained in the pilot host set 230. If the test deployment to the pilot host set 230 is successful, the deployment may enter a fleet-wide deployment stage whereby remaining hosts 112 in the host fleet 110 may be deployed with the update 216.

To ensure a safe host deployment, the pilot host set 230 may be constructed to include pilot hosts that are representative of the hosts 112 in the host fleet 110, such that deployment of the update 216 to these pilot hosts can be utilized to predict effects of deploying the updates to other hosts 112 in the host fleet 110, if any. According to embodiments, host attributes 116 may be employed to measure the representativeness of pilot hosts and, thereby, be utilized in selecting the pilot hosts in the pilot host set 230.

Depending on the nature of the update 216, some of the host attributes 116 might be more relevant than others to the selection of pilot hosts in the pilot host set 230. For example, the update 216 may be an upgrade of network drivers installed on hosts 112. In this case, host attributes 116 such as network addressing type might be more relevant than host attributes 116 like hardware platform type to the selection of pilot hosts. As such, in some embodiments, a subset of host attributes 116 stored in the host attribute data store 114 may be identified as relevant host attributes 210 for use in the construction of the pilot host set 230. According to the embodiment illustrated in FIG. 2, the host attribute selection component 202 of the host deployment module 108 may be configured to identify the relevant host attributes 210.

In one implementation, the host attributes selection component 202 may present a user interface 124 allowing a user 102 to specify among various available host attributes 116 the relevant host attributes 210 for an update 216. The user 102 may specify the relevant host attributes 210 based on his/her knowledge on the update 216, or based on a host attribute selection recommendation 220 provided by the host attributes selection component 202. As will be described in greater detail below, the host attribute selection recommendation 220 may be generated by the deployment analysis component 208 according to various deployment data 218 obtained during the deployment of update 216 to the host fleet 110. Alternatively, the relevant host attributes 210 might be automatically determined by the host attributes selection component 202 based on the host attribute selection recommendation 220 without user interference.

Once the relevant host attributes 210 have been specified, the pilot host selection component 204 may be utilized to select pilot hosts to construct a pilot host set 230 for a test deployment. In embodiments, the pilot host selection component 204 may classify the hosts 112 in the host fleet 110 into groups based on the relevant host attributes 210. These groups may be constructed by including in a group those hosts to which the impacts of deploying the update 216 are similar enough such that a small number of hosts from that group can be representative of all the hosts contained within the group.

Based on the classified groups, the pilot host selection component 204 may further select pilot hosts for the pilot host set 230. Depending on the size and properties of the host fleet 110 and/or any possible size limit or host count limit of the pilot host set 230, the strategies for selecting the pilot host set 230 may vary. For instance, if an allowed size of the pilot host set 230 is comparable to the number of the groups, the pilot host set 230 may be constructed by selecting one or more representative hosts from each of the classified groups. However, if the allowed size of the pilot host set 230 is much smaller than the number of classified groups, the pilot host set 230 can only include hosts from some of the classified groups, and hosts from the remaining groups may not be included in the pilot host set 230.

In these scenarios, the selection of pilot host set 230 may be achieved by assigning different priorities to various groups so that pilot hosts from groups with a higher priority may be included in the pilot host set 230 before hosts from groups with a lower priority. In one embodiment, the priority assigned to groups may be determined by the property of the update 216. For example, the update 216 may be a critical and urgent update, and a successful deployment to a majority of the hosts 112 in the host fleet 110 may be preferred. The pilot host set 230 for such an update may be constructed to represent as many hosts 112 as possible so that a majority of hosts 112 can be covered during the test deployment. To achieve such a goal, a "head first" strategy may be adopted by assigning a higher priority to groups having a larger size than that assigned to groups with a smaller size. A pilot host representing more hosts, i.e. a pilot host from a large group, will thus have a higher priority to be included in the pilot host set 230.

In another example, the update 216 may be a non-urgent update, but the deployment of the update 216 may require a long period of time. For such an update, it may be less crucial for the pilot host set 230 to cover a majority of hosts 112 in the host fleet 110, whereas identifying any potential problem in the update deployment as early as possible may be more important. In this case, hosts in a group with a small size may be worth testing during the test deployment, because these hosts can be considered as outliers and deployment problems might be more likely to occur to outlier hosts. As such, a higher priority may be assigned to groups with a smaller size than that assigned to groups with a larger size. This is known as a "tail first" strategy.

It should be appreciated that the examples of assigning priorities to various groups given above are merely illustrative and should not be construed as limiting. Other strategies of assigning priority to groups to facilitate the selection of the pilot host set 230 may be utilized. For example, priorities may be assigned randomly to groups such that the pilot host set 230 may be constructed by randomly selecting pilot hosts from the groups regardless of the group size. Various other linear or non-linear, deterministic or stochastic functions may also be constructed based on the size or other properties of the groups and be utilized to assign priorities to the groups.

As discussed above, there might be a size limit or a host count limit for the pilot host set 230. This host count limit of the pilot host set 230 may be determined by the pilot host selection component 204 based on the properties, such as the complexity, of the update 216, and it may also be specified by the user 102 in pilot host selection criteria 212. The host count limit of the pilot host set 230 might be specified in the form of a fixed number, such as 100 pilot hosts. Alternatively, or additionally, the host count limit of the pilot host set 230 might also be specified as a function of the pilot hosts included in the pilot host set 230.

For example, according to one embodiment, the host count limit of the pilot host set 230 might be set according to the following formula:

$$C=\min\{|c||H(c)\geq T\},$$

wherein C is the host count limit of the pilot host set 230; c is a vector representing a pilot host set 230; H(c) is a function outputting a ratio of hosts 112 represented by the pilot host set c over all the hosts in the host fleet 110; |c| denotes the host count of the pilot host set c; and T is a threshold. In other words, the host count limit of the pilot host set 230 may be set such that the ratio of hosts 112 in the host fleet 110 represented by the pilot host set 230 is no smaller than a threshold value T.

In some implementations, the threshold value T may be set to be equal to a success threshold $T_{success}$. The success threshold $T_{success}$ may be utilized to judge whether a deployment is successful or not. A deployment may be considered as successful if the ratio of successfully deployed hosts over the entire host fleet 110 exceeds the success threshold $T_{success}$. If the success threshold $T_{success}$ is set to be 95%, according to the implementations, the threshold value T used for determining the host count limit of the pilot host set 230 may also be set to be 95%. In this case, at least the number of hosts 112 required by a successful deployment may be represented by the pilot host set 230 and thus may be tested in the test deployment. It should be understood that the above example is for illustration only, and should not be construed as limiting. Other ways of selecting the threshold value T may be utilized and/or other methods of calculating the host count limit of the pilot host set 230 might also be employed.

Figure 3:
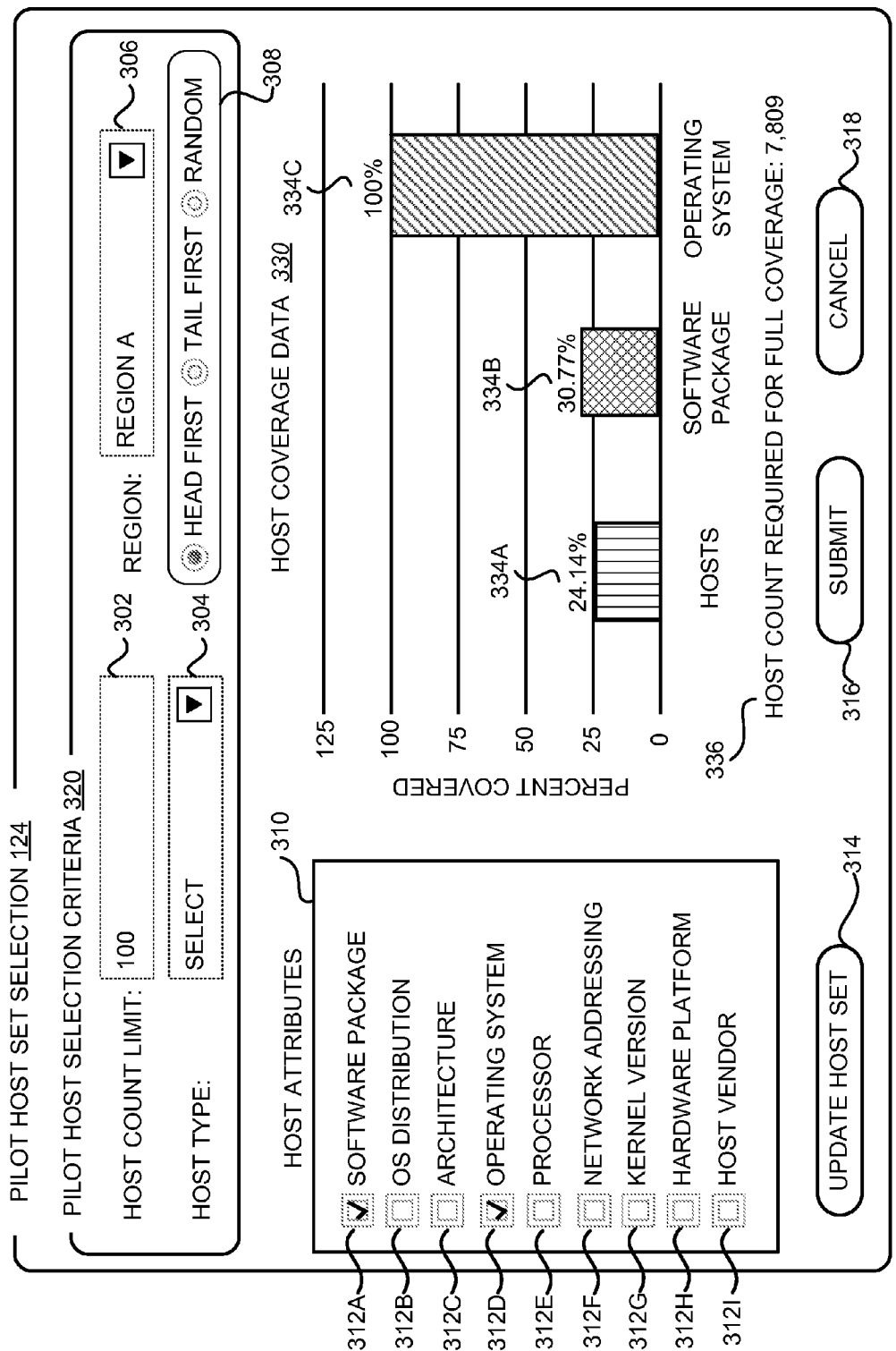
FIG. 3 is a user interface diagram showing an illustrative pilot host set selection user interface provided in one embodiment disclosed herein.

Apart from the host count limit of the pilot host set 230, the pilot host selection criteria 212 may also include various other criteria for constructing the pilot host set 230 including, but not limited to, the strategy for assigning group priority as discussed above, a region of the pilot hosts, a type of the pilot hosts and others. In one implementation, the pilot host selection criteria 212 may be specified by the user 102 through a user interface 124 provided by host deployment module 108 via user computing system 104. FIG. 3 illustrates an example user interface 124 for pilot host set selection provided in one embodiment disclosed herein.

The illustrative user interface 124 shown in FIG. 3 may be provided by both the host attributes selection component 202 and the pilot host selection component 204, and may allow a user 102 to identify the relevant host attributes 210 and further select the pilot host set 230. The user interface 124 show in FIG. 3 may include a host attributes selection panel 310 that lists one or more host attributes 116 available in the host attribute data store 114. The name of each host attribute 116 and a brief description of each host attribute 116 might also be provided. A checkbox 312A-312I is displayed next to each of the available host attributes 116 in one embodiment. Selection of one of the checkboxes 312A-312I will cause the corresponding host attributes to be selected as the relevant host attributes 210 and be utilized to construct the pilot host set 230 by the pilot host selection component 204.

The user interface 124 may also include a pilot host selection criteria panel 320 for setting the pilot host selection criteria 212. The pilot host selection criteria panel 320 may include a field 302 for setting the host count limit for the pilot host set 230 as discussed above, a region field 306 and a host type filed 304 for further limiting the pilot hosts to be selected from a certain region and/or to be certain type. The pilot host selection criteria panel 320 might also include a priority selection control 308 for specifying priorities of groups to be selected to construct the pilot host set 230.

When a user 102 has completed the selection of relevant host attributes 210 and the pilot host selection criteria 212, the user 102 may select the user interface control 314 to update the pilot host selection. A graphic chart 330 may then be generated to provide a graphic view of host coverage data based on the selected pilot hosts. For example, the graphic chart 330 may illustrate the percentage of hosts 116 in the host fleet 110 that are covered or represented by the selected pilot host set 230, as illustrated by the graphic column 334A. Similarly, coverage data may also be illustrated for each of the relevant host attributes 210 used in the selection of pilot host set 230, such as the graphic columns 334B and 334C corresponding to the selected host attributes "software package" and "operating system," respectively. The user interface 124 may also include an information bar 336 providing various information to the user 102 with regard to the pilot host selection process, such as the status of the pilot host selection process, recommendations to the user 102 as to the selection of the relevant host attributes 212, the host count required for a full coverage, and other information.

In the example illustrated in FIG. 3, by specifying the host count limit of the pilot host set 230 to be 100, the constructed pilot host set 230 based on the selected relevant attributes only covers or represents 24.14% of the hosts in the host fleet 110. That is, the hosts contained in the groups represented by the pilot host set 230 only constitute 24.14% of the host fleet 110. The information bar 336 indicates that a full coverage would require 7,809 pilot hosts to be included in the pilot host set 230. Based on these data, the user 102 may adjust the selection of the host attributes and/or the pilot host selection criteria 212 through the user interface 124. Any changes made in the user interface 124 may be confirmed and reflected in the graphic chart 330 and/or the information bar 336 by selecting the user interface control 314. Once the user 102 has completed the pilot host selection, the user 102 may continue with the deployment by selecting the user interface control 316. The user may select the user interface control 318 to cancel the selection of pilot hosts.

It should be appreciated that the user interface 124 shown in FIG. 3 is merely illustrative and that other types and arrangements of user interface controls for selecting relevant host attributes 210 and pilot host selection criteria 212 might be presented in other embodiments. It should be further appreciated that while FIG. 3 illustrates one user interface 124 is provided by both the host attributes selection component 202 and the pilot host selection component 204 for identifying the relevant host attributes 210 and selecting the pilot host set 230, separate user interfaces may be provided by these two components to achieve their respective goals.

Referring back to FIG. 2, once the pilot host set 230 has been determined, the pilot host selection component 204 may inform the deployment control component 206 to perform the test deployment by deploying the update 216 to pilot hosts in the pilot host set 230. The deployment control component 206 may further monitor the progress of the test deployment and determine if the test deployment is successful. In some implementations, the test deployment is determined to be successful only if all the pilot hosts in the pilot host set 230 report a successful deployment of the update 216, whereas in other implementations, the test deployment is determined to be successful if a portion of the pilot hosts in the pilot host set 230 has successfully deployed the update 216. In one implementation, an update to a host may be considered as successful if the update does not cause an increase in system errors or performance degradation.

If it is determined that the test deployment is successful, the deployment control component 206 may then enter the fleet-wide deployment stage to deploy the update 216 to the remaining hosts in the host fleet 110 or a portion thereof. If it is determined that the test deployment is unsuccessful, the deployment control component 206 may modify the deployment, such as by continuing the deployment of the update 216 to those hosts whose corresponding pilot host has been successfully deployed, or by canceling the deployment of the update 216 and restoring the pilot hosts in the pilot host set 230 back to their states before the test deployment. Throughout the deployment process, the deployment control component 206 may collect deployment data 218 with regard to the deployment process from the hosts 112 in the host fleet 110. The deployment data 218 may include, but are not limited to, an indication of success or failure of the deployment on a host 112, error messages or warning messages generated during the deployment, status of the host 112 at the time of the generation of the error messages or warning messages, and other data.

In another implementation, the fleet-wide deployment may be performed by an entity other than the host deployment module 108. The host deployment module 108, for example, the deployment control component 206, may send instructions or messages to that entity to deploy the update to the remaining hosts in or a portion of the host fleet and may also receive the deployment data 218 from that entity.

The deployment control component 206 may then send the deployment data 218 to the deployment analysis component 208 for further analysis. The deployment analysis component 208 may utilize technologies such as data mining and machine learning to analyze the deployment data 218. For example, the analysis may identify impacts of various updates to the hosts 112 based on their corresponding host attributes 116. Such an analysis may help to provide an insight for the selection of the relevant host attributes 210 given a certain type of updates so that the pilot host set 230 constructed based on the relevant host attributes 210 may well represent the host fleet 110 when deploying the update. As discussed above, a host attribute selection recommendation 220 may be generated based on the analysis and provided to host attributes selection component 202 to facilitate the selection of the relevant host attributes 210. It should be appreciated that other analysis may be performed at the deployment analysis component 208 and the results thereof may be utilized by any components inside or external to the host deployment module 108 to support the deployment of the update 216.

Figure 4:
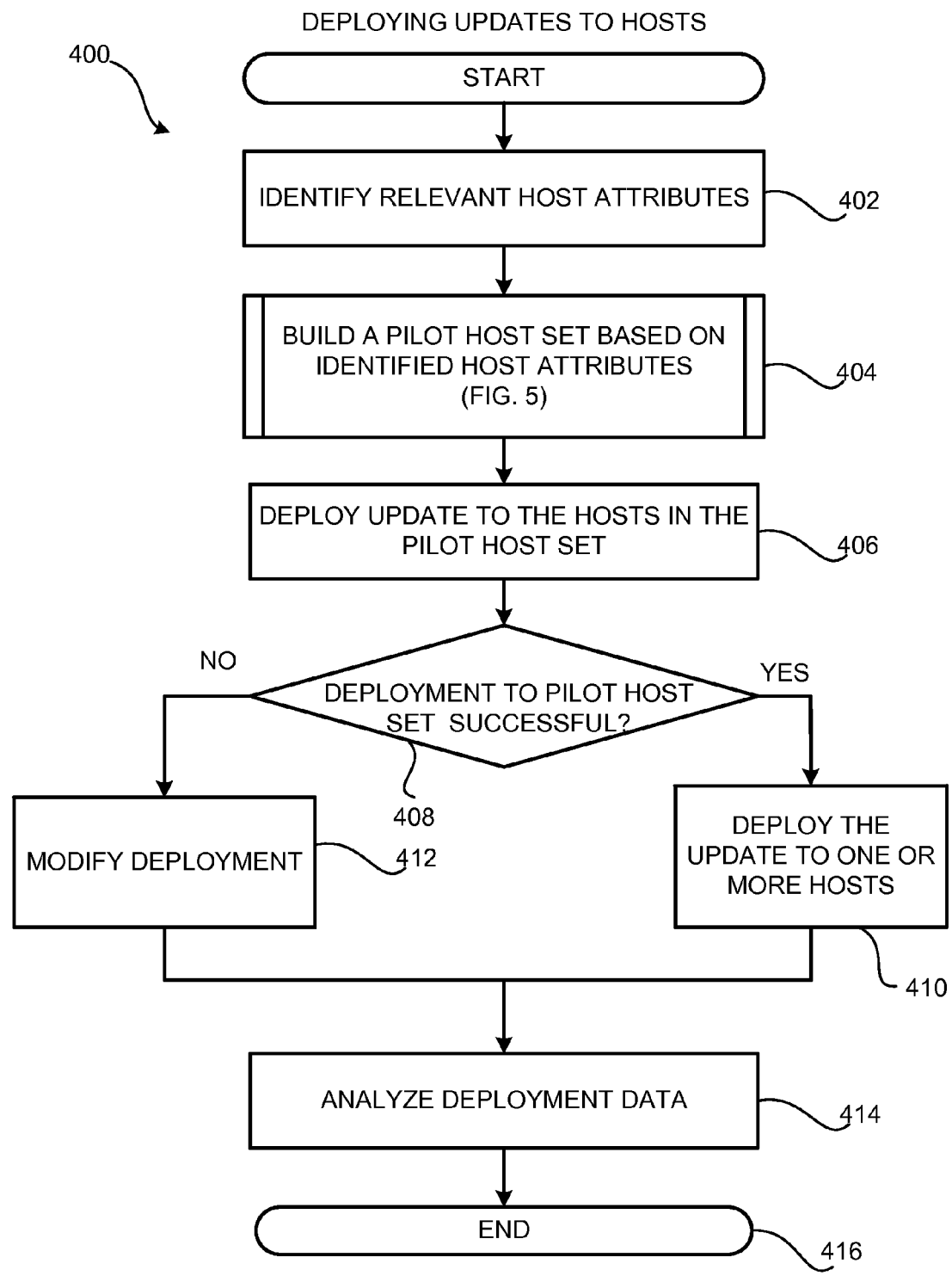
FIG. 4 is a flow diagram showing one illustrative routine for deploying updates to hosts in a host fleet, according to one embodiment disclosed herein.

FIG. 4 is a flow diagram showing aspects of one illustrative routine 400 for deploying updates to hosts 112 in a host fleet 110, according to one embodiment disclosed herein. In some implementations, the routine 400 is performed by the host deployment module 108 described above in regard to FIGS. 1 and 2. It should be appreciated, however, that the routine 400 might also be performed by other modules and/or components or other entities in the system illustrated in FIG. 1.

It should also be appreciated that the logical operations described herein with respect to FIG. 4 and the other figures are implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 400 begins at operation 402, where the host deployment module 108 identifies relevant host attributes 210. As mentioned above, a user 102 may select the relevant host attributes 210 from available host attributes 116 stored in the host attribute data store 114 through a user interface 124. The user 102 may also be provided with a host attribute selection recommendation 220 generated by analyzing existing deployment data 218. Alternatively, or additionally, the host deployment module 108 may automatically determine the relevant host attributes 210 based on the host attribute selection recommendation 220.

From operation 402, the routine 400 proceeds to operation 404, where a pilot host set 230 may be built based on the identified relevant host attributes 210. The pilot host set 230 may include pilot hosts that are representative of the hosts 112 in the host fleet 110, and thus may have a size much smaller than the host fleet 110. Deploying an update 216 to the pilot host set 230 may be utilized to estimate the impact of the update 216 to the hosts 112 in the host fleet 110. If the deployment to the pilot host set 230 is safe and does not cause any error, the deployment to the hosts 112 in the host fleet 110 that are represented by the pilot host set 230 might also be safe and error-free. Similarly, a problem identified during the deployment of an update to the pilot host set 230 might suggest a potential problem if the update was deployed to the host fleet 110, and proper actions may be taken before the actual fleet-wide deployment of the update. Additional details regarding building the pilot host set 230 are provided below with regard to FIGS. 5 and 6.

From operation 404, the routine 400 proceeds to operation 406, where a test deployment to the pilot hosts included in the pilot host set 230 may be performed. The routine 400 further proceeds to operation 408, where a determination is made as to whether the deployment to the pilot host set 230 is successful. If it is determined that the test deployment is successful, the routine 400 proceeds to operation 410, where the update may be deployed to one or more of the remaining hosts in the host fleet 110; otherwise the routine 400 proceeds to operation 412, where the deployment may be modified, such as by continuing the deployment of the update 216 to those hosts whose corresponding pilot host has been successfully deployed, or by canceling the deployment of the update 216 and restoring the pilot hosts in their respective states prior to the test deployment.

From either operation 410 or operation 412, the routine 400 proceeds to operation 414, where deployment data 218 may be analyzed and analysis results such as host attribute selection recommendation 220 may be generated for use in succeeding deployments. From operation 414, the routine 400 proceeds to operation 416, where it ends.

Figure 5:
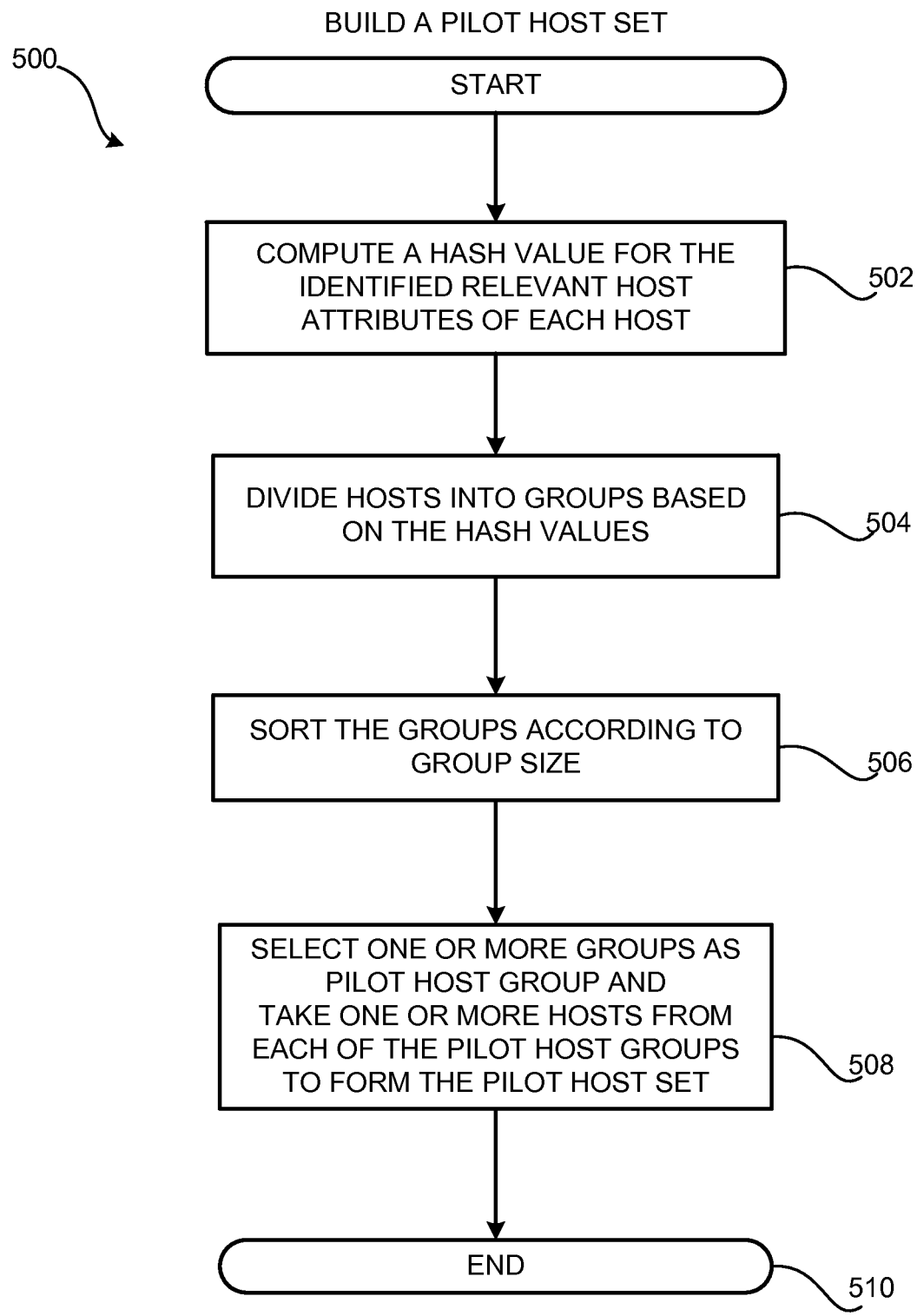
FIG. 5 is a flow diagram showing one illustrative routine for building a pilot host set for host deployment, according to one embodiment disclosed herein.
Figure 6A:
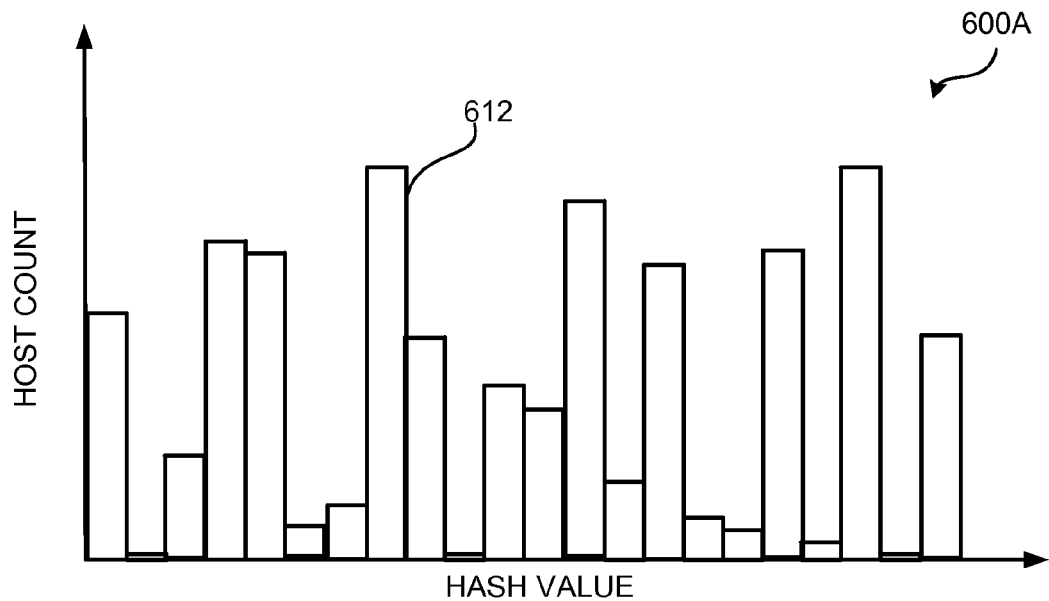
FIGS. 6A and 6B are graphical diagrams showing an illustrative distribution of groups of the hosts in a host fleet before and after sorting, respectively.
Figure 6B:
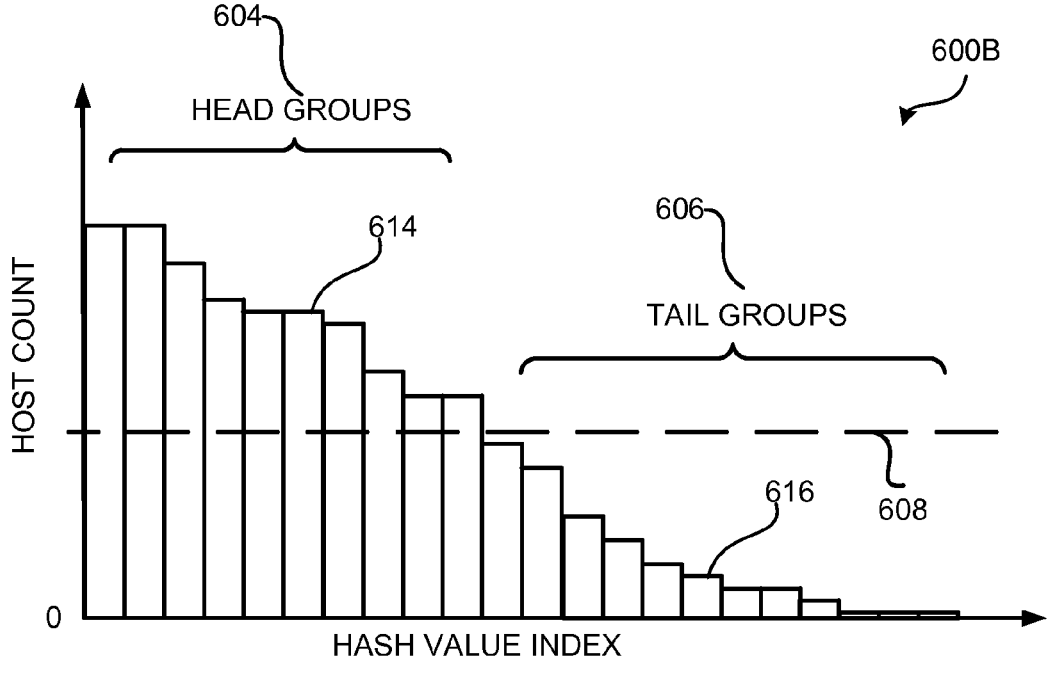

FIG. 5 is a flow diagram showing a routine 500 for building a pilot host set 230 to be utilized in a test deployment, according to one embodiment disclosed herein. In some implementations, the pilot host selection component 204 included in the host deployment module 108 described above in regard to FIG. 2 may perform the routine 500. It should be appreciated that the routine 500 might also be performed by other modules and/or components of the host deployment module 108 or by modules and/or components of other entities in the environment 100. FIG. 5 will be described in conjunction with FIGS. 6A and 6B. FIGS. 6A and 6B are graphical diagrams showing an illustrative distribution of hash values for host attributes of the hosts in a host fleet 110 before and after sorting, respectively.

The routine 500 begins at operation 502, where a hash value may be computed for the identified relevant host attributes 210 for each host 112 in the host fleet 110. Hosts having same values for the relevant host attributes 210 will have a same hash value, whereas hosts having different values for the relevant host attributes 210 will obtain different hash values. As such, the calculated hash value for each host 112 may be an indication of similarities among the hosts 112 from the perspective of the relevant host attributes 210.

From operation 502, the routine 500 proceeds to operation 504, where the hosts 112 in the host fleet 110 may be divided into groups. In one embodiment, the groups may be constructed by placing hosts having the same hash value into one group. FIG. 6A illustrates an example distribution diagram 600A of the constructed groups. The vertical axis of the diagram 600A represents the host count, and the horizontal axis of the diagram 600A represents hash values that are calculated for the relevant host attributes 210 of the hosts 112 in the host fleet 110. Each column 612 illustrated in diagram 600A represents a group corresponding to a hash value, and the height of the column 612 indicates the size of the group in term of host count. As can be seen from the diagram 600A, some groups have a large size indicating that a large number of hosts 112 have the same hash value, whereas some other groups have a small size meaning that only a small number of hosts 112 share the same hash value.

From operation 504, the routine 500 proceeds to operation 506, where the groups may be sorted according to their group sizes. FIG. 6B illustrates a sorted group distribution diagram 600B by sorting the groups shown in FIG. 6A according to their sizes in a descending order. The vertical axis of the diagram 600B represents the host count, and the horizontal axis of the diagram 600B represents the index of hash values. A hash value index i corresponds to the i-th largest group.

The routine 500 then proceeds from operation 506 to operation 508, where one or more groups may be selected as pilot host groups and one or more hosts may be selected from each pilot host groups to form the pilot host set 230. According to embodiments, the selection of the pilot host groups and the subsequent construction of the pilot host set 230 may be performed under the pilot host selection criteria 212 specified by the user 102. As mentioned above, the pilot host selection criteria 212 may be input by the user 102 through a user interface 124, through a configuration file or through any other mechanism that can be utilized to deliver the pilot host selection criteria 212 to the pilot host selection component 204 for the selection of the pilot host set 230.

The pilot host selection criteria 212 might include a priority strategy for selecting pilot groups. As discussed above, a "head first" strategy may be adopted when trying to utilize the test deployment to cover as many hosts as possible, and a "tail first" strategy may be adopted when an early identification of problems in deploying an update is to be achieved. The head first strategy and the tail first strategy may be illustrated using the diagram 600B shown in FIG. 6B. In the diagram 600B, some groups may be defined as head groups, while some other groups may be defined as tail groups. According to one implementation, a group may be defined as a head group if its size is larger than the average size of the groups. According to this definition, a group 614 shown in diagram 600B that has a size larger than the average group size, indicated by a horizontal line 608 in the diagram 600B, may belong to the host groups 604. Similarly, a group may be defined as a tail group if its size is smaller than the average size of the groups. Group 616 shown in the diagram 600B may belong to tail groups 606.

It should be understood that the above example is for illustration only, and the definitions of head groups 604 and tail groups 606 are not necessarily limited to the form described above. Other ways of defining head groups 604 and tail groups 606 might also be employed. For example, a group may be defined as a head group if its size is larger than p % of the largest group size and a group may be defined as a tail group if its size is smaller than q % of the largest group size, where p and q are parameters that may be specified by the user 102 or determined in the host deployment module 108. Alternatively, head groups 604 may be defined as the groups that are among the top r % of the sorted groups, and the tail groups 606 may be defined as the groups that are among the bottom t % of the sorted groups. Similarly, t and r are parameters that may be specified by the user 102 or determined in the host deployment module 108. Various other algorithms or methods may be utilized to perform statistical analysis on the groups to determine the head groups and/or the tail groups, including using the average group size as the threshold as discussed above, or employing the median group size as the threshold.

Based on the priority strategy as well as other criteria specified in the pilot host selection criteria 212, one or more head groups and/or tail groups may be selected as the pilot groups. One or more hosts from each pilot group may then be chosen to form the pilot host set 230. In one implementation, the pilot host set 230 may be constructed by selecting only one host from each pilot group. From operation 508, the routine 500 proceeds to operation 510, where it ends.

It should be appreciated that the process of building a pilot host set 230 described in FIG. 5 is merely illustrative and that other implementations might also be utilized. In particular, the groups may be formed without computing hash values for the relevant host attributes 210 of each host 112 in the host fleet 110. For instance, the relevant host attributes 210 for each host 112 may be utilized as a feature vector for the corresponding host, and classification or clustering analysis techniques, such as support vector machine and/or a k-means algorithm, may be utilized to classify the hosts 112 into groups based on their feature vectors. It should be further understood that the pilot host set 230 may be directly selected from the hosts 112 in the host fleet 110 based on the relevant host attributes 210 without building any groups. Various other techniques of building the pilot host set 230 may also be utilized.

Figure 7:
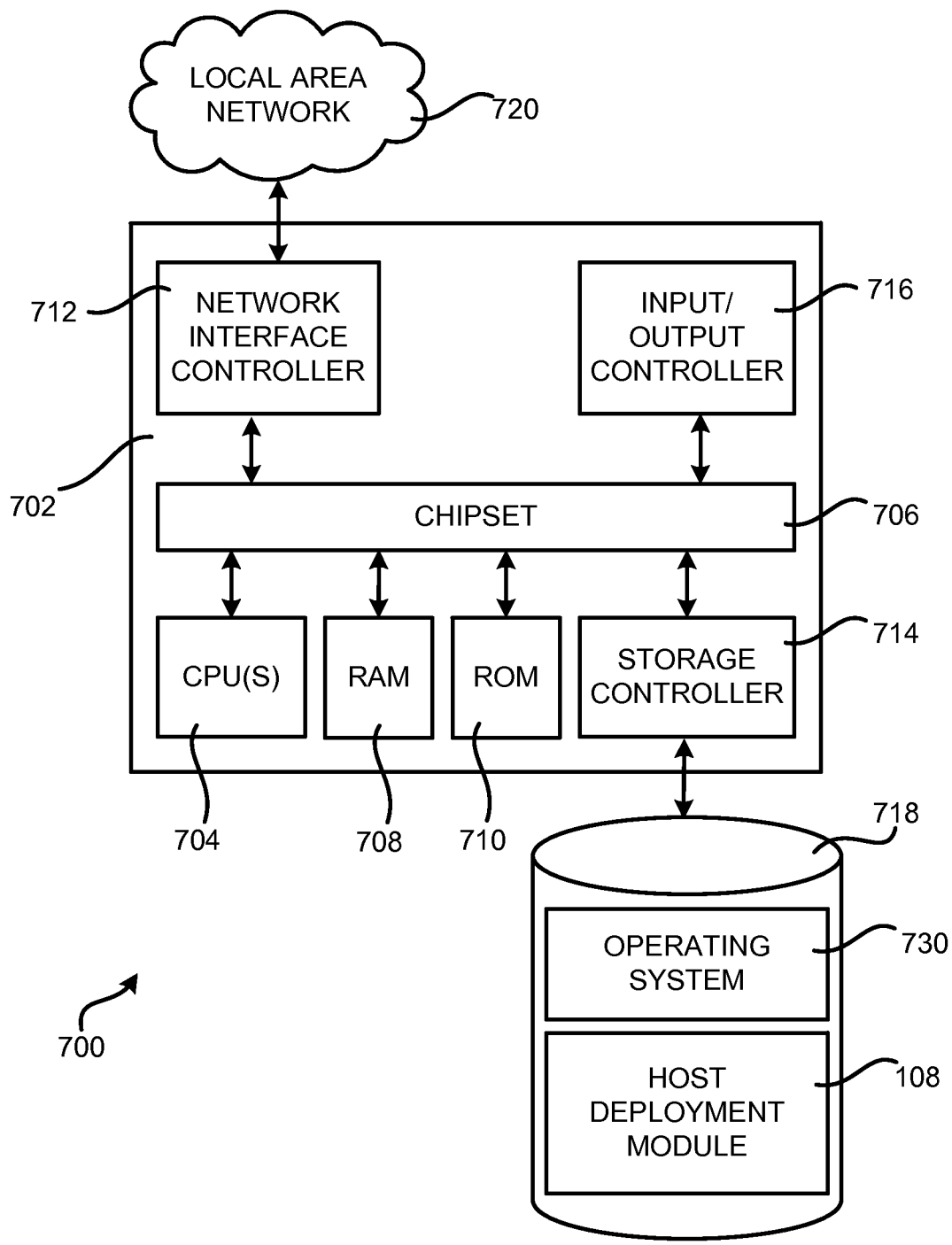
FIG. 7 is a computer architecture diagram showing one illustrative computer hardware architecture for implementing a computing device that might be utilized to implement aspects of the various embodiments presented herein.

FIG. 7 shows an example computer architecture for a computer 700 capable of executing the program components described above for deploying updates to hosts in a heterogeneous host fleet. The computer architecture shown in FIG. 7 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein. For example, the computer architecture shown in FIG. 7 may be utilized to execute the host deployment module 108 shown in FIG. 1 and described above.

The computer 700 includes a baseboard 702, or "motherboard," which is a printed circuit board to which a multitude of components or devices may be connected by way of a system bus or other electrical communication paths. In one illustrative embodiment, one or more central processing units ("CPUs") 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a random access memory ("RAM") 708, used as the main memory in the computer 700. The chipset 706 may further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM may also store other software components necessary for the operation of the computer 700 in accordance with the embodiments described herein.

The computer 700 may operate in a networked environment using logical connections to remote computing devices and computer systems through a network, such as the local area network 720. The chipset 706 may include functionality for providing network connectivity through a NIC 712, such as a gigabit Ethernet adapter. The NIC 712 is capable of connecting the computer 700 to other computing devices over the network 720. It should be appreciated that multiple NICs 712 may be present in the computer 700, connecting the computer to other types of networks and remote computer systems.

The computer 700 may be connected to a mass storage device 718 that provides non-volatile storage for the computer. The mass storage device 718 may store system programs, application programs, other program modules, and data, which have been described in greater detail herein. The mass storage device 718 may be connected to the computer 700 through a storage controller 714 connected to the chipset 706. The mass storage device 718 may consist of one or more physical storage units. The storage controller 714 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 may store data on the mass storage device 718 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 718 is characterized as primary or secondary storage, and the like.

For example, the computer 700 may store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 718 by detecting the physical states or characteristics of one or more particular locations within the physical storage units.

In addition to the mass storage device 718 described above, the computer 700 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 700.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 718 may store an operating system 730 utilized to control the operation of the computer 700. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 718 may store other system or application programs and data utilized by the computer 700, such as the host deployment module 108 and/or any the other software components and data described above. The mass storage device 718 might also store other programs and data not specifically identified herein.

In one embodiment, the mass storage device 718 or other computer-readable storage media is encoded with computer-executable instructions which, when loaded into the computer 700, transforms the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the routines described above with regard to FIGS. 4 and 5. The computer 700 might also include computer-readable storage media for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, the input/output controller 716 may provide output to a display, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

Based on the foregoing, it should be appreciated that technologies for deploying updates to hosts in a heterogeneous host fleet have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for deploying updates to hosts in a set of hosts, the method comprising performing computer-implemented operations for:
    identifying one or more host attributes for individual hosts in a set of hosts;
    computing a hash value for the identified host attributes for the individual hosts in the set of hosts;
    dividing the set of hosts into one or more groups, each group comprising hosts having a same hash value for the identified host attributes;
    assigning a priority to individual groups of the one or more groups;
    building a pilot host set by selecting hosts for the pilot host set from groups assigned a higher priority before hosts from groups assigned a lower priority, such that the number of hosts in the pilot host set does not exceed a host count limit, wherein one or more head groups or tail groups is selected as the pilot host set, a head group having a group size larger than an average group size for the one or more groups and a tail group having a group size smaller than an average group size for the one or more groups;
    deploying an update to hosts contained in the pilot host set;
    determining that deploying the update to the hosts contained in the pilot host set is successful; and
    deploying the update to at least a portion of the hosts in the set of hosts in response to determining that deploying the update to the hosts contained in the pilot host set is successful.

2. The computer-implemented method of claim 1, further comprising modifying deploying the update in response to determining that deploying the update to the hosts contained in the pilot host set is unsuccessful.

3. The computer-implemented method of claim 1, wherein assigning the priority to the individual groups is based at least in part on a size of the individual group.

4. The computer-implemented method of claim 1, further comprising collecting data regarding deploying the update to the hosts in the set of hosts, wherein the one or more host attributes are identified by analyzing the collected data.

5. The computer-implemented method of claim 1, wherein the selecting is based at least in part on including hosts from groups with a number of hosts greater than a threshold amount.

6. The computer-implemented method of claim 1, wherein identifying the one or more host attributes for each host in the set of hosts includes identifying software and hardware configurations.

7. A system for deploying updates to hosts, the system comprising:
    a set of hosts to which an update is to be deployed; and
    at least one computing device executing a host deployment module configured to:
        identify one or more host attributes for individual hosts in the set of hosts;
        compute a hash value for the identified host attributes for the individual hosts in the set of hosts;
        divide the set of hosts into one or more groups, each group comprising hosts having a same hash value for the identified host attributes;
        assign a priority to individual groups of the one or more groups;
        build a pilot host set by selecting hosts for the pilot host set from groups assigned a higher priority before hosts from groups assigned a lower priority, such that the number of hosts in the pilot host set does not exceed a host count limit, wherein one or more head groups or tail groups is selected as the pilot host set, a head group having a group size larger than an average group size for the one or mere groups and a tail group having a group size smaller than an average group size for the one or more groups;
        deploy the update to hosts contained in the pilot host set;
        determine that deploying the update to the hosts contained in the pilot host set is successful; and
        cause the update to be deployed to at least a portion of the hosts in the set of hosts in response to determining that deploying the update to the hosts contained in the pilot host set is successful.

8. The system of claim 7, wherein the host deployment module is further configured to modify deploying the update in response to determining that deploying the update to the hosts contained in the pilot host set is unsuccessful.

9. The system of claim 7, wherein the host deployment module is further configured to collect data regarding deploying the update to the hosts in the set of hosts, wherein the one or more relevant host attributes are identified by analyzing the collected data.

10. The system of claim 7, wherein the one or more host attributes are selected by a user from a list of available host attributes through a user interface.

11. The system of claim 7, wherein the host deployment module is further configured to recommend the host attributes for the hosts in the set of hosts.

12. A non-transitory computer-readable storage medium having computer-executable instructions stored thereupon which, when executed by a computer, cause the computer to:
    identify one or more host attributes for individual hosts in a set of hosts;

compute a hash value for the identified host attributes for the individual hosts in the set of hosts;

divide the set of hosts into one or more groups, each croup comprising hosts having a same hash value for the identified host attributes;

assign a priority to individual groups of the one or more groups;

build a pilot host set by selecting hosts for the pilot host set from groups assigned a higher priority before hosts from groups assigned a lower priority, such that the number of hosts in the pilot host set does not exceed a host count limit, wherein one or more head groups or tail groups is selected as the pilot host set, a head group having a group size larger than an average group size for the one or more groups and a tail group having a group size smaller than an average group size for the one or more groups;

deploy an update to hosts contained in the pilot host set;

determine that deploying the update to the hosts contained in the pilot host set is successful; and deploy the update to at least a portion of the hosts in the set of hosts in response to determining that deploying the update to the hosts contained in the pilot host set is successful.

13. The non-transitory computer-readable storage medium of claim 12, further comprising computer executable instructions which, when executed by the computer, cause the computer to: modify deploying the update in response to determining that deploying the update to the hosts contained in the pilot host set is unsuccessful.

14. The non-transitory computer-readable storage medium of 12, further comprising computer executable instructions which, when executed by the computer, cause the computer to collect data regarding deploying the update to the hosts in the set of hosts, wherein the one or more host attributes are identified by analyzing the collected data.

* * * * *